US009523986B1

(12) United States Patent
Abebe et al.

(10) Patent No.: US 9,523,986 B1
(45) Date of Patent: Dec. 20, 2016

(54) SYSTEM AND METHOD FOR SECURE, PRIVACY-AWARE AND CONTEXTUALISED PACKAGE DELIVERY USING AUTONOMOUS VEHICLES

(71) Applicant: International Business Machines Corporation, Armonk, NY (US)

(72) Inventors: Ermyas Abebe, Altona (AU); Dileban Karunamoorthy, Carlton (AU); Kent Steer, Brunswick (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/959,059

(22) Filed: Dec. 4, 2015

(51) Int. Cl.
| G05B 19/18 | (2006.01) |
| G05D 1/10 | (2006.01) |
| B64C 39/02 | (2006.01) |
| G05D 1/00 | (2006.01) |

(52) U.S. Cl.
CPC .............. *G05D 1/101* (2013.01); *B64C 39/024* (2013.01); *G05D 1/0011* (2013.01); *B64C 2201/128* (2013.01)

(58) Field of Classification Search
CPC ...... G05D 1/101; G05D 1/0011; B64C 39/024
See application file for complete search history.

(56) References Cited

U.S. PATENT DOCUMENTS

| 4,790,402 A | 12/1988 | Field |
| 8,825,226 B1* | 9/2014 | Worley, III ............... A63J 1/00 180/170 |
| 8,930,044 B1 | 1/2015 | Peeters |
| 9,022,324 B1 | 5/2015 | Abhyanker |
| 2014/0254896 A1 | 9/2014 | Zhou |
| 2015/0154557 A1 | 6/2015 | Skaaksrud |
| 2015/0242972 A1 | 8/2015 | Lemmey |
| 2015/0248640 A1* | 9/2015 | Srinivasan ....... G06Q 10/08355 705/338 |

* cited by examiner

*Primary Examiner* — Ian Jen
(74) *Attorney, Agent, or Firm* — Cantor Colburn LLP; Louis Percello

(57) ABSTRACT

Disclosed herein is a system for coordinating the delivery of a payload by a drone to a recipient, the system comprising a drone; where the drone is an autonomous vehicle that is operative to perform one or more functions without human intervention; and a facility agent acting on behalf of a facility in which the recipient is located; where the facility agent is autonomous and is operative to act on behalf of either the recipient or the facility in which the recipient is located; and where the facility agent comprises an access option enumerator for computing a set of delivery strategies in accordance with a constraint or a goal; and an access negotiator for reaching an agreement between the drone and the facility agent on the delivery strategy for the payload.

18 Claims, 3 Drawing Sheets

SYSTEM AND METHOD FOR SECURE, PRIVACY-AWARE AND CONTEXTUALISED PACKAGE DELIVERY USING AUTONOMOUS VEHICLES

BACKGROUND

This disclosure relates to a system and to a method for secure, privacy aware and contextualized package delivery using an autonomous vehicle.

The use of drones for delivering articles of commerce directly from storage to the home offers considerable advantages in terms of efficiency, scalability, flexibility and improved user experience. A multitude of different companies are investing considerably in this space, and new laws that govern the operation of drones are also being created to enable the wider-scale adoption of this emerging technology. A key concern regarding the operation of drones is their implications for security and privacy. Vehicles equipped with cameras, microphones and other sensors potentially violate the privacy of people and the security of institutions. The ability of drones to deliver unauthorized and potentially dangerous packages also raises a notable security concerns.

In addition to security and privacy concerns, it is desirable for effective package delivery (to building complexes) that drones have access to local information such as building layouts, location of a recipient and context-specific data in addition to global navigation information (city maps, presence of high tension wires, street light wiring, and the like).

SUMMARY

Disclosed herein is a system for coordinating the delivery of a payload by a drone to a recipient, the system comprising a drone; where the drone is an autonomous vehicle that is operative to perform one or more functions without human intervention; and a facility agent acting on behalf of a facility in which the recipient is located; where the facility agent is autonomous and is operative to act on behalf of either the recipient or the facility in which the recipient is located; and where the facility agent comprises an access option enumerator for computing a set of delivery strategies in accordance with a constraint or a goal; and an access negotiator for reaching an agreement between the drone and the facility agent on the delivery strategy for the payload.

Disclosed herein too is a method comprising autonomously initiating communication between a drone and a facility agent located at a facility where the drone will deliver a payload to; offering the drone a set of delivery strategies in accordance with a constraint or a goal; and reaching an agreement between the drone and the facility agent on one delivery strategy for the payload.

Disclosed herein too is a computer program product comprising a non-transitory storage medium readable by a processing circuit and storing instructions for execution by the processing circuit for performing a method comprising autonomously initiating communication between a drone and a facility agent located at a facility where the drone will deliver a payload to; offering the drone a set of delivery strategies in accordance with a constraint or a goal; and reaching an agreement between the drone and the facility agent on one delivery strategy for the payload.

DETAILED DESCRIPTION

Figure 1:
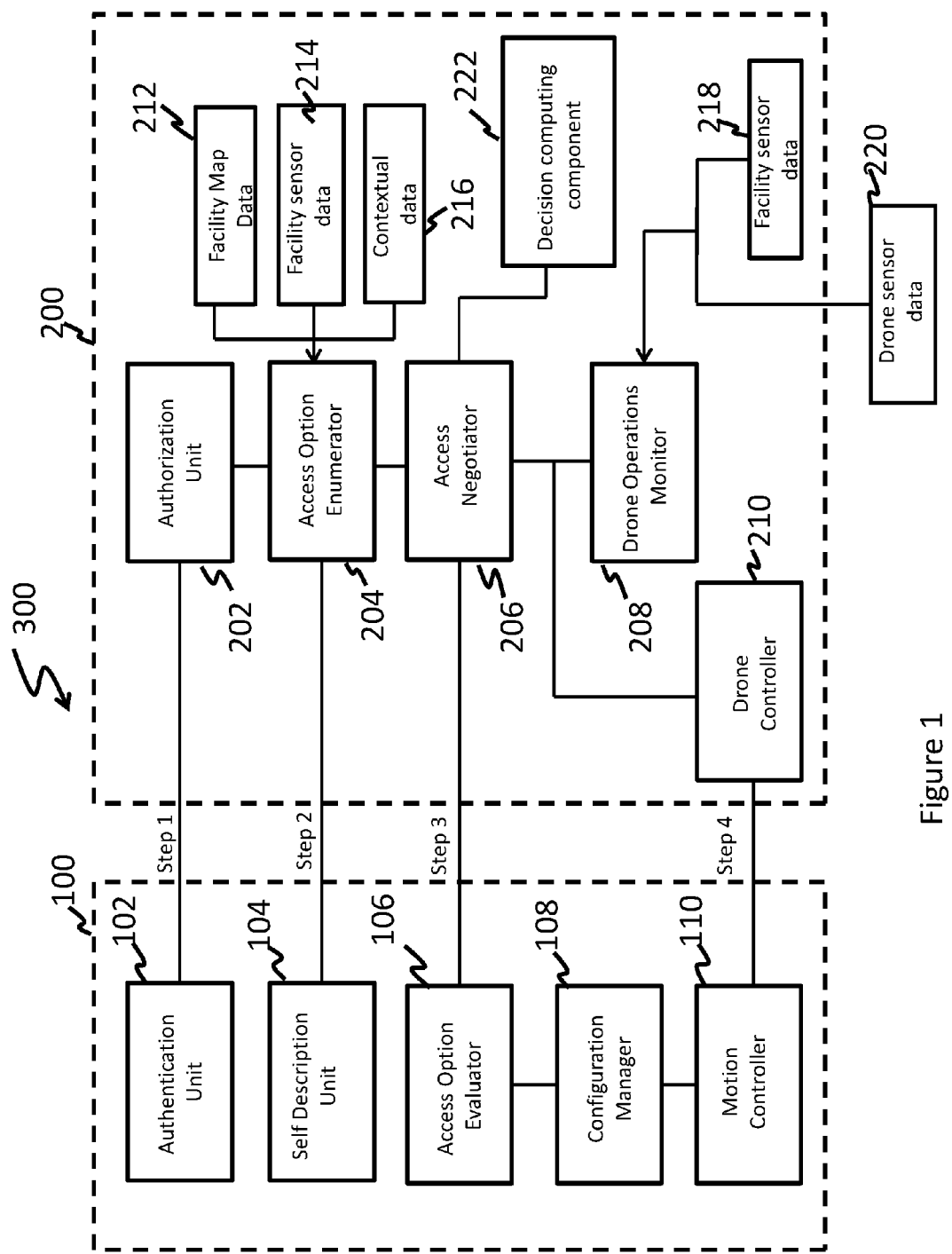
FIG. 1 depicts an exemplary interaction between the drone and the facility agent as the drone approaches a facility that it desires entry into.

The following terms are used herein.

Package—one or more items (e.g., articles of commerce) intended for delivery by a drone to a recipient in a given facility. The package is also referred to herein as the "payload". The payload may comprise a single package or a plurality of packages.

Recipient—an entity or person to whom the one or more items are to be delivered to.

Drone—an autonomous or semi-autonomous vehicle that delivers packages to recipients and that is capable of performing some functions without human intervention. Examples of flight-related functions may include, but are not limited to, sensing its environment or operating in the air without a need for input from an operator, among others. For instance, some functions could be controlled by a remote human operator, while other functions are carried out autonomously. Further, a drone may be configured to allow a remote operator to take over functions that can otherwise be controlled autonomously by the drone. Yet further, a given type of function may be controlled remotely at one level of abstraction and performed autonomously at another level of abstraction. For example, a remote operator could control high level navigation decisions for a drone, such as by specifying that the drone should travel from one location to another (e.g., from the city hall in Palo Alto to the city hall in San Francisco), while the drone's navigation system autonomously controls more fine-grained navigation decisions, such as the specific route to take between the two locations, specific flight controls to achieve the route and avoid obstacles while navigating the route, and so on. Other examples are also possible. A drone can be of various forms. For example, a drone may take the form of a rotorcraft such as a helicopter or multicopter, a fixed-wing aircraft, a ducted fan aircraft, a lighter-than-air dirigible such as a blimp or steerable balloon, a tail-sitter aircraft, a glider aircraft, and/or an ornithopter, among other possibilities.

Facility Agent—an automated system (e.g., a smart building controller) acting on behalf of the either the recipient or the facility in which the recipient is located. The automated system may comprise sensors and actuators to monitor and control whole or portions of the facility. The system enforces and monitors the perimeter of the facility to monitor unauthorized entry of drones.

Facility—an area in the nature of a government buildings, hospitals, school, factory, corporate or residential building, with a geo-fenced perimeter in 4 dimensional space marking the recipient's addressed location.

Communication system—a system that is operative to allow the drone to communicate with the facility agent; the communication system may be provided by the facility, the drone or by both, the drone and the facility agent.

Disclosed herein is a method for achieving secure, privacy-aware and contextualized navigation of drones inside the perimeter of secure facilities (e.g., government buildings, hospitals, schools, factories, residential buildings, and the like) through a negotiation protocol between a delivery drone and an automated facility agent acting on behalf of the recipient or the facility (e.g., a smart-building controller). In this approach, once a delivery drone reaches a perimeter of the facility, it requests authorization and specific navigation instructions from the automated facility agent, which computes a route based on factors including: contextual information about the recipient, the facility, the capabilities of the drone and meta-data associated with its payload, other drones in the area, and the like. The facility agent enumerates a set of possible access options that the drone can select from. Each option includes: (1) one or more access routes and drop-off points, which conform to defined privacy and security exposure rules of the facility as well as that of its occupants, and (2) desired configuration changes by the drone in order to access the facility via a given route (e.g., disable sensor, actuator or software capabilities, and the like).

A negotiation step enables the drone to contact the facility agent and to select and put into effect one of a set of options offered by the facility agent. The facility agent supervises and monitors the navigation and overall compliance of drone operation within the facility through operational data streamed from the drone and real-time sensor data collected from within the facility. In another embodiment, the local facility agent may request navigational control of the delivery drone for the duration of its delivery process within the local premises, and control its operations within the facility. The specific benefits of this approach are a) enabling a secure and privacy-aware operation of drones within security sensitive facilities and b) contextualized delivery of packages within local facilities (e.g., delivery to a specific location of a recipient within facility).

FIG. 1 is a depiction of an exemplary interaction 300 between the drone 100 and the facility agent 200. The drone 100 contains an authentication unit 102 that is operative to transmit the drone's capabilities to an authorized agency. It contains a self-description unit 104 that can transmit details about the drone's payload and intentions to the facility agent 200. It contains an access option evaluator 106 and a configuration manager 108 that evaluates options received from the facility agent and configures the drone (for delivering its payload) based on these options. It also contains a motion controller 110 that controls the motion of the drone 100 based either on an internal program or based upon a program supplied to it by an external agency such as the facility agent 200.

The facility agent 200 comprises an authorization unit that is operative to authorize drones 100 to enter its space (called the facility) one it has authenticated the information provided to it by the drone 100. The facility agent 200 contains an access option enumerator 204 and an access negotiator 206 that provide options to the drone 100 and negotiate options with the drone 100 respectively. The access option enumerator 204 is in communication with a database that contains facility map data 212, facility sensor data 214 and contextual data 216. In an embodiment, the access option enumerator 204 is in two-way communication with a database that contains facility map data 212, facility sensor data 214 and contextual data 216. The facility agent 200 also contains a drone operations monitor 208 that is in communication with a drone controller 210. The drone operations monitor 208 is in communication with a database that contains facility sensor data 218 and drone sensor data 220. In an embodiment, the drone operations monitor 208 is in two-way communication with a database that is operative to store facility sensor data 218 and drone sensor data 220.

The interaction between the drone 100 and the facility agent 200 is detailed in steps. In Step 1, the facility agent 200 seeks to authenticate the authenticity or authority of the drone 100. In Step 2, the drone 100 provides information to the facility agent about its features, such as, for example, its communication systems, its payload, the names of the recipients and the number of packages for each of the recipients. In Step 2, it can also communicate the time limits that it desires to perform its task. In Step 3, the facility agent 200 provides the drone 100 with specifications as to how to proceed through the facility; it provides it with directions, altitudes, frequencies at which to continue communication at, and the like. In this step, the facility agent 200 offers the drone 100 strategies by which it can accomplish its goals. The drone 100 may select some of the strategy and communicates these to the facility agent 200.

The facility agent 200 communicates a selected subset of candidate options to drone 100 and negotiates option modifications. In an embodiment, the facility agent 200 and the drone 100 can agree on a mutual strategy for enabling both the facility and the drone to meet their goals. Examples of a mutual strategy can include attempting to maximize some goals, such as, improving the efficiency of delivery (e.g., the speed of delivery, flying in formation with other drones to affect speed and reduce energy consumption), meeting energy conservation and pollution goals (e.g., safety promotion, noise abatement, exhaust reduction, visibility reduction, environmental protection, and the like) or some combination of weighted functions for each of these strategies.

In the Step 4, the drone controller 210 communicates with the motion controller 110 to effect control of the drone. The drone 100 may hand over control to the facility agent 200. In an embodiment, the drone controller 210 may co-opt command of the drone 100 from motion controller 110 and may direct the drone to its destination based on the agreed plan.

While the steps in the FIG. 1 are sequentially numbered Step 1, Step 2, Step 3, and so on, it is to be noted that the steps may be performed in any convenient sequence. The steps can be performed sequentially or simultaneously. For example, Step 1 can be merged with Step 2. In another example, if there are several other drones within the facility, Step 2 may be performed ahead of Step 1. The sequence of steps may be determined by either the drone, the facility agent or by both the drone and the facility agent. Steps may also be skipped if both the drone 100 and the facility agent 200 agree that a particular step is not necessary. For example, parts of Step 1 and Step 2 may not be performed if the same drone approaches the same facility with the same payload a second time.

In Step 1, the drone 100 interacts with the facility agent 200 as it is about to enter the airspace of the facility agent 200 or when the drone 100 plans to enter the airspace of the facility agent 200. In an embodiment, the drone 100 autonomously initiates communication with the facility agent located at the facility when the drone arrives at a location that is proximate to the facility but remote from the facility. A database located in the drone (See FIG. 3) triggers the drone to initiate contact with the facility agent upon arrival at a way-point proximate to but remote from the facility. The way-point may be identified by latitude and longitude via a global positioning system (GPS), by the presence of a very high frequency omnidirectional range finder (VOR) or by the visual identification of a landmark such as a water tower or cell-phone tower.

The drone 100 might contact and communicate with the facility agent 200 (or vice-versa) in a number of ways including using edge-nodes in a local network or through the cloud. Communication systems for use by the drone 100 and the facility agent 200 are detailed below. The authorization agent 202 of the facility agent 200 communicates with the authentication unit 102 present in the drone 100 to effect the authentication. In an embodiment, the authentication unit 102 communicates its identity to the authorization unit 202 in the form of a security/data wrapper. The data wrapper may include security/privacy parameters associated with the rights, permissions, and other indicia used to define and indicate the security and privacy parameters related to the person's data privacy and security requirements. In other embodiments, the security/privacy parameters include one or more levels of negotiable privacy and security parameters. For example, the security/privacy parameters may include permissions to copyrighted material and the use or sale thereof to third parties. In other examples, the security/privacy parameters may use cases for certain data, such as personal data associated with a person's social security number, body type, weight, address, age, fingerprint identification, and other data personal to the person.

In an embodiment, the authentication may comprise owner identification (ID) (the commercial entity that owns the drone 100) in the form of an encrypted file, that is a combination of personal data and other data unique to the person or to the entity that owns the drone 100. Such an owner ID may also contain the negotiation parameters or be tied to a contract or other document that indicates the person's data utilization criteria and negotiation parameters. For example, the owner ID may be linked to a terms of service that stipulates the owner's intended use for the data being transmitted, the expiration date or time, data recombination criteria, monetary information for data use, and the like. The owner ID may also be used as a virtual watermark that may be used to detect violation of the agreements associated with the owner ID. The owner ID may be configured as metadata that is attached to the data being transacted, be a pointer used to direct the data flow to a particular data rights management system, may include a digital key to lock and/or unlock an encrypted storage location, may be part of one or more header files used in packet transmission, and the like. In an exemplary embodiment, the authorization unit 202 authenticates the drone 100 via an authentication unit 102 contained in the drone 100 and the drone 100 also verifies the authenticity of the facility agent 200 through digital key-based authentication.

With reference now again to the FIG. 1 in Step 1, the facility agent 200 contains an authorization unit 202 that verifies the authentication information received from the authentication unit 102 of the drone 100 and then moves onto Step 2 where it queries the drone 100 about its payload and other details that are described below.

In Step 2, the drone 100 contains a self-description unit 104 that describes the payload as well as the drone 100 characteristics to the facility agent 200. This transfer may be initiated by a self-description unit 104 in the drone, or alternatively, be initiated through a request from the facility agent 200. The self-description unit 104 communicates with the access option enumerator 204 contained in the facility agent 200. The access option enumerator 204 can use information obtained from the self-description unit 104 to align the drone's desires with operating protocols (e.g., communication frequencies to be used in different areas of the facility, altitudes and routes to be used within the facility, areas that packages have to be dropped off in or picked up at, and the like) by accessing sources available at its disposal such as facility map data 212 (e.g., the facility layout and coordinates to be used to travel uninterrupted, altitudes to be used as different locations in the facility, and the like), sensor data 214 (e.g. the locations of various sensors within the facility, communication frequencies for the different sensors, and the like) and other contextual data 214 (e.g., airspeeds to be used, delivery times for different clients, and the like). In an embodiment, the facility map data 212, the facility sensor data 214, and the contextual data 216 may be stored in a database (not shown) contained in the facility agent.

The self-description unit 104 transfers drone data pertaining to (a) drone metadata: manufacturer, make, model, delivery operator, list of hardware sensors and actuators, software details, and the like, (b) package metadata: details of sender(s), receiver(s), the number of package(s) dimensions, weight(s), and the like, (c) drone negotiation parameters: the drone may also provide additional information indicating what configurations it is willing to change to enter the facility (e.g., disabling sensors or recording capabilities), and (d) indication of the presence of other packages intended for delivery to other recipients not housed within the facility (the presence of other packages on the drone from unknown sources could pose a security risk to the facility and the facility agent 200 might factor this in when computing a routing decision).

As noted above, Step 1 could be merged with Step 2. In short, some or all of the data provided by the drone to the facility agent and/or the data provided by the facility agent to the drone in Step 2 may be merged with Step 1. The information obtained in Step 2 can be used in the authentication process. In this approach the facility agent 200 would correlate the drone's delivery information against expected deliveries as an added authentication step.

In Step 3, the facility agent 200 provides the drone 100 with specifications as to how to proceed through the facility; it provides it with directions, altitudes, frequencies at which to communicate, details of various communication systems, and the like. In this step, the access negotiator 206 from the facility agent 200 communicates with the access option evaluator 106 from the drone 100. The drone 100 may make its intentions and goals known to the access negotiator 206. Examples of such goals are detailed below. The access negotiator 206 offers the access option evaluator 106 strategies by which it can accomplish its goals. The drone 100 (via the access option evaluator 106) may select some of the strategies offered it and communicates these to the facility agent 200.

Examples of the drone's goals may be an estimated time of arrival at the facility, the amount of time it intends to complete the delivery task within, the altitude(s) it desires to fly at, whether it will fly alone or in formation with other independent drones through the facility, the amount of fuel it is willing to expend on the endeavor, noise levels that it will produce within the facility, the configuration it will fly in, the communication systems it is capable of using, dimensions of the payload it will be carrying, or the like, or a combination thereof.

The facility agent 200 upon receiving the drone's desired goals communicates a selected subset of candidate options to drone 100 and negotiates option modifications. In an embodiment, the facility agent 200 and the drone 100 can agree on a mutual strategy for enabling both the facility and the drone to meet their goals. Examples of a mutual strategy can include attempting to maximize some goals, such as, improving the efficiency of delivery (e.g., the speed of delivery, flying in formation with other drones to affect speed and reduce energy consumption), meeting energy conservation and pollution goals (e.g., noise abatement, exhaust reduction, visibility reduction, and the like), minimize unnecessary communication, or some combination of weighted functions for each of these strategies.

Based upon the strategies accepted by the drone 100 and the facility agent 200, the facility agent 200 computes a set of possible options for the drone's access of the facility. Each option would include a route, a drop-off point, and a list of configuration changes required by the drone to traverse the route, as well as any additional information about the option (e.g., time, altitude, frequencies, and the like). The decision (vis-à-vis the various options) factors in the (a) information provided in Steps 2 and 3 above, and existing (b) information that the facility agent 200 retains about the facility (such as secure areas) and (c) dynamic contextual information about the facility and the recipient(s) (e.g., in a large campus for instance the current location of the drone within the facility could be used to guide a decision. The agent could leverage sensors, local notification mechanism, and the like, to determine this information) to compute one or more drop-off points and 4 dimensional route(s) for drone navigation, wherein the fourth dimension constitutes time. The time attribute of a route segment would stipulate a completion time by which point the drone would have had to traverse the said route segment.

The decision is usually based on a computation of an efficient route that minimizes the privacy and security exposures of the facility and its occupants/stake-holders by accounting for the capability of the drones and various aspects of the facility and its recipient. For instance, the specific details about a camera(s) mounted on the drone 100 and its view angles could be factored in to determine a route that avoids or reduces exposure of sensitive portions of the facility from this sensor. A decision computing component 222 of the access negotiator 206 generates a set of candidate options each of which would contain: (a) one or more drop-off points (b) a set of route segments leading from point of entry to a facility to one or more drop-off points and finally an exit point (c) list of capabilities of drone that must be disabled, relinquished, supervised or reconfigured for specified route-segment (d) supervision requirements (streaming of drone activity data) (e) efficiency of each option (e.g. in terms of time or estimated energy usage).

The drone 100 accepts one of the options offered to it by the decision computing component 222 and notifies the facility agent of its decision. If the drone 100 does not choose one of options offered it the first time around, it may ask the facility agent 200 to reevaluate options and choose a different option from a different selection proffered it by the facility agent 200. In an embodiment, when the drone 100 has made its election, the drone is given permission by the facility agent 200 to proceed according to the option chosen. Upon receiving a set of options from the facility agent 200, the drone 100 computes its own estimate of the utility of each option and selects and negotiates options with the facility agent's access negotiator 206. Once an option is selected, the drone 100 reconfigures its system to comply with the selected option. Drone 100 navigates the route according to the selected option and streams monitoring data about its route to facility agent. The option selected by the drone 100 is activated by the motion controller 110 located in it. The drone 100 flies the selected option while being controlled by the motion controller 110 located within it.

The facility agent 200 monitors the operation of the drone 100 within the premises by using a combination of information sent from the drone 100 and data received from sensors deployed within the facility. In an embodiment, the monitoring data may be collected in the form of drone sensor data 220 (derived from the drone's sensors) and facility sensor data 218 (derived from the facility's sensors). The option selected along with the data recorded by the facility sensor data 218 and the drone sensor data 220 may be stored on a database (not shown) in the facility agent 200 and can reused to guide the drone should it desire to reenter the facility additional times with a plan similar to that used for this particular flight.

Monitoring of the drone's progress may be conducted through non-invasive observation (e.g., video) or though attachment of a physical device that is trusted and more easily tracked (e.g., the drone maybe be required to 'wear' a transponder that is set to a frequency selected by the facility agent 200) while on the premises. The facility agent 200 might deploy actuators to enable the drone's operations as part of this process (e.g., open hatches, windows, and the like). In the event that a drone is observed to digress from the selected option (i.e., the agreed plan), it is assumed that the facility agent will act in the form of alerts to building authorities or employ means of suppressing further drone activity.

It is envisioned that in some cases it might be desirable for the drone 100 to relinquish navigational control to the facility agent. In this embodiment the agent establishes a remote interface to the drone's navigation capabilities and guides it through its chosen route until it completes delivery and exits the perimeter of the facility, after which time the agent relinquishes control back to the drone. In this embodiment, the drone 100 may surrender control from its motion controller 110 to the drone controller 210 contained in the facility agent 200, which may then assume the responsibility for piloting the drone 100 to its intended destination. In this option too, the drone's progress is monitored by the information collected in the form of drone sensor data 220 (derived from the drone's sensors) and facility sensor data 218 (derived from the facility's sensors that communicate with the drone).

In the event that the drone 100 is carrying multiple packages addressed to multiple recipients within the same facility, the facility agent 200 could utilize local contextual information to compute an efficient route for the drone to deliver the package to all recipients. The facility agent 200 might monitor local contextual data and update drone route as delivery is progressing.

In another embodiment, a drone hand-off could be coordinated where the drone 100 delivers a portion of its payload or the entire payload to a designated location and a second local drone picks up item from the location and delivers it to the designated recipient.

The method detailed above in the FIG. 1 can be expressed in the form of an algorithm or a process flow diagram. An algorithm 400 that directs the communication between the drone 100 and the facility agent is shown in the FIG. 2. With reference now to both the FIGS. 1 and 2, as the drone 100 approaches the facility two way communications are established between the drone 100 and the facility agent 200 as shown in process Step 402. If authentication 404 occurs then the drone proceeds to Step 406 where it sends metadata about itself along with details about its packages (See Step 1 in the FIGS. 1 and 2). If authentication (See Step 404) does not then the attempt is aborted (See Step 412). If authentication 404 does occur, then in Step 408 the agent computes one or more access routes, drop off points, and drone reconfiguration options. Steps 404 and 406 are a part of Step 1 in the FIG. 1. In Step 410, the drone 100 evaluates each option and selects a strategy and communicates it to the facility agent 200. Step 408 and Step 410 in the FIG. 2 are part of Step 2 in the FIG. 1.

If the drone finds an acceptable option 414, then the drone 100 is queried as to whether the facility agents drone controller 210 can control the drone (See Step 416). If the drone 100 rejects this request, then the drone reconfigures its sensor, actuators and software components to comply with the selected option (See Step 418). After the drone 100 reconfigures its sensors in step 418, the facility agent 200 uses the drone operations monitor (See 208 from the FIG. 1) to monitor drone compliance to the selected option. The drone navigates the selected route delivers the package and exits the facility (See Step 422).

If in Step 416, the drone 100 agrees to allow the facility agent's drone controller 210 (See FIG. 1) to control it, then the facility agent 200 establishes connection to the drone's remote navigation interface (See Step 424). The facility agent 200 navigates the drone 100 along the selected route to deliver the package and exit the facility (See Step 426). Steps 416, 418, 424 and 426 in the FIG. 2 are part of Step 3 in the FIG. 1, while Steps 420, 422 and 428 in the FIG. 2 are part of Step 4 in the FIG. 1.

Figure 2:
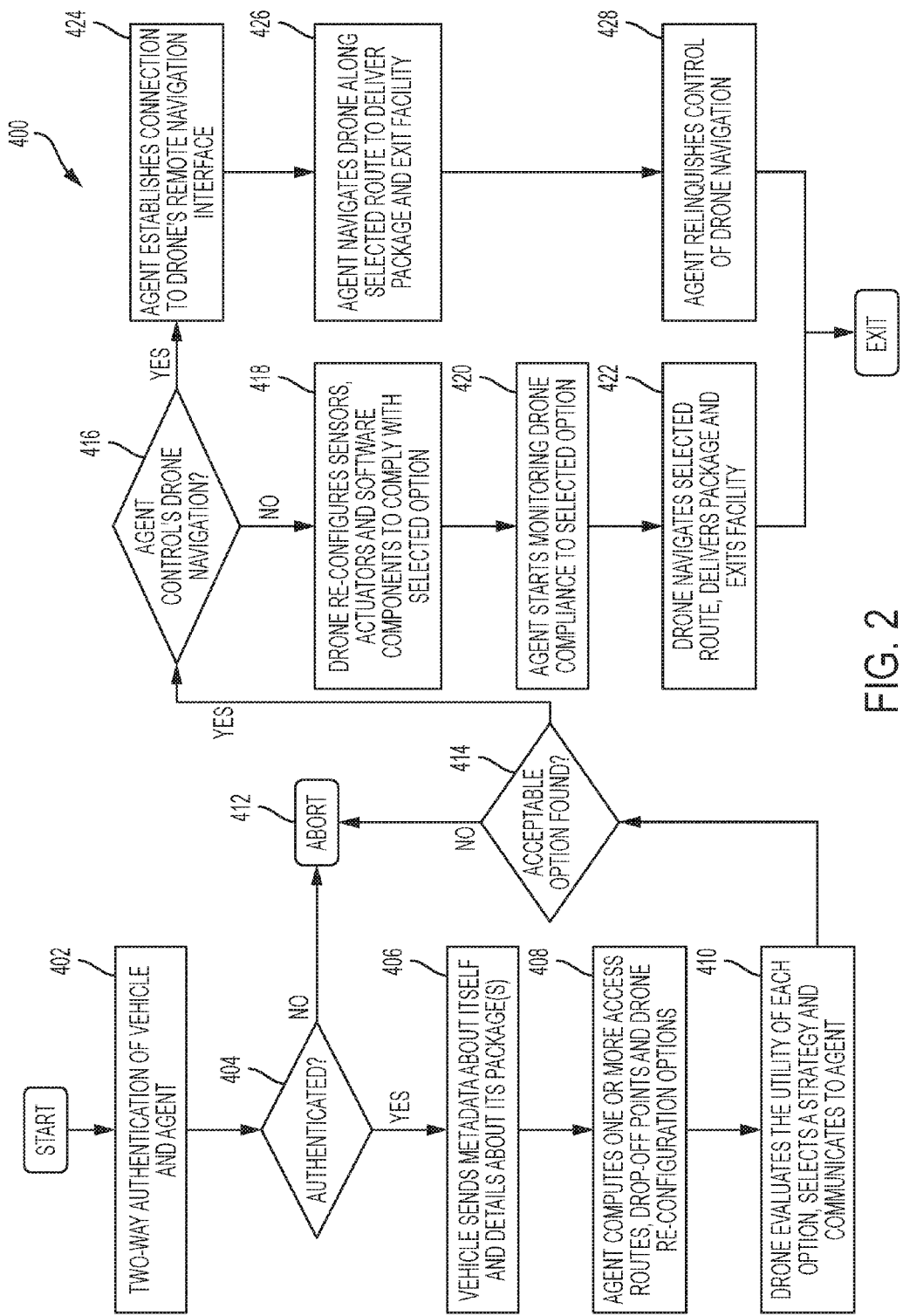
FIG. 2 depicts an exemplary algorithm for communication protocols between the drone and the facility agent.
Figure 3:
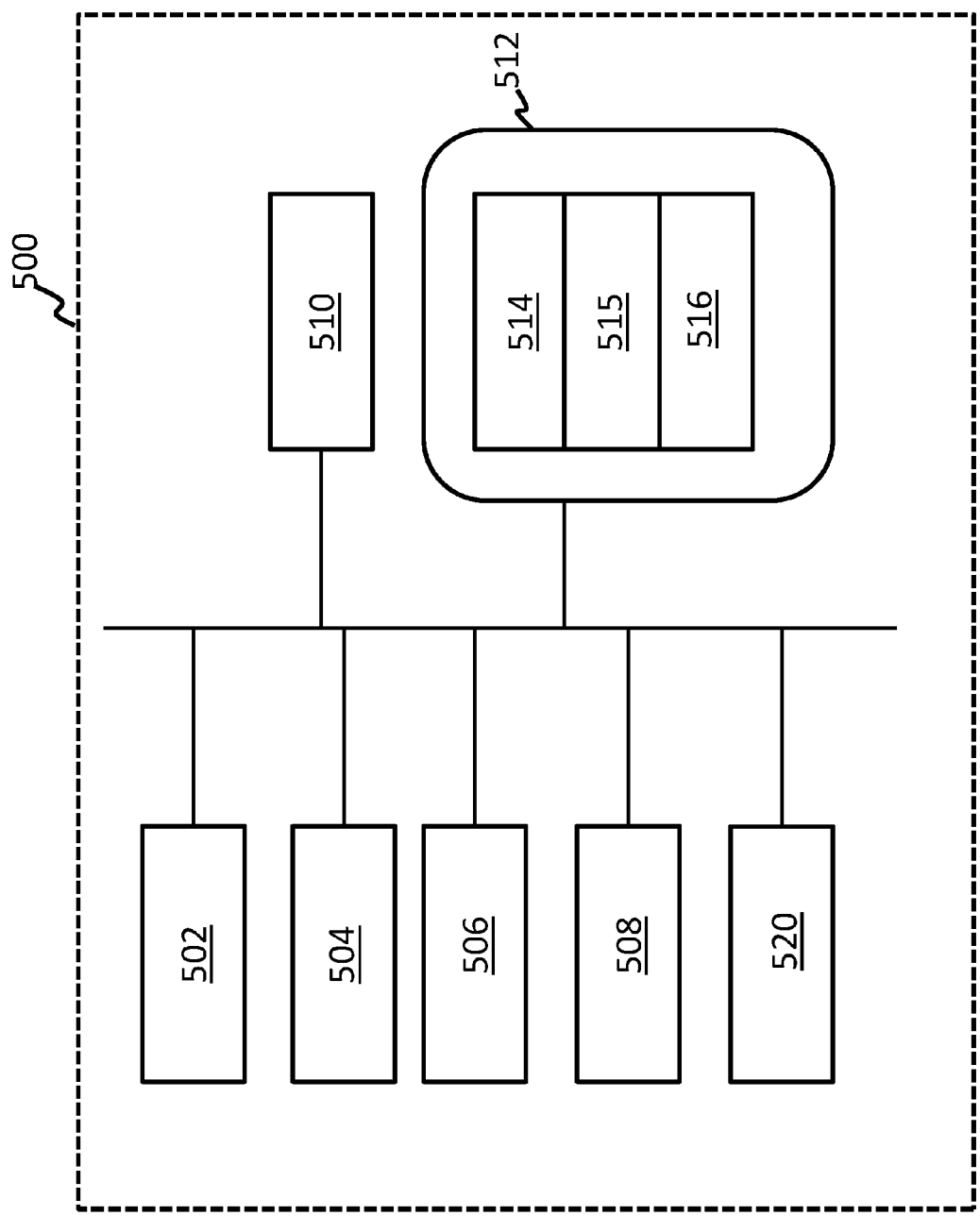
FIG. 3 is an exemplary depiction of the communication between the processor, the database and the communication system and sensors of the drone and/or the facility agent.

In order for the drone 100 and the facility agent 200 to communicate effectively with each other and to effect the algorithm shown in the FIG. 2, both the drone 100 and the facility agent 200 are provided with sensors, communication systems, processors, databases and computers arranged to produce the functionality detailed herein. One exemplary set-up for both the drone 100 and/or the facility agent 200 is shown in the FIG. 3. FIG. 3 is an exemplary depiction of the set-up 500 that includes the processor, the database and the communication system and sensors of the drone and/or the facility agent. In the FIG. 3, the sensors of the drone 100 and/or the facility agent 200 include an inertial measurement unit (IMU) 502, sensor(s) 504, global positioning system (GPS) 506, imaging system(s) 508, among other possible sensors and sensing systems. The set-up also includes a communication system 520 also detailed above.

In the FIG. 3, the drone 100 and/or the facility agent 200 also include one or more processors 510. A processor 510 may be a general-purpose processor or a special purpose processor (e.g., digital signal processors, application specific integrated circuits, and the like). The one or more processors 510 can be configured to execute computer-readable program instructions 514 that are stored in the data storage 512 and are executable to provide the functionality of the drone 100 and/or the facility agent 200 described herein.

The data storage 512 may include or take the form of one or more computer-readable storage media that can be read or accessed by at least one processor 510. The one or more computer-readable storage media can include volatile and/or non-volatile storage components, such as optical, magnetic, organic or other memory or disc storage, which can be integrated in whole or in part with at least one of the one or more processors 510. In some embodiments, the data storage 512 can be implemented using a single physical device (e.g., one optical, magnetic, organic or other memory or disc storage unit), while in other embodiments, the data storage 512 can be implemented using two or more physical devices.

As noted, the data storage 512 can include computer-readable program instructions 514 and perhaps additional data, such as diagnostic data of the drone 100 and/or the facility agent 200. As such, the data storage 512 may include program instructions to perform or to facilitate some or all of the drone 100 and/or the facility agent 200 functionality detailed herein. For instance, in the illustrated embodiments, program instructions 514 include a navigation module 515 and one or more payload distribution modules 516.

In an illustrative embodiment, IMU 502 may include both an accelerometer and a gyroscope, which may be used together to determine the orientation of the drone. In particular, the accelerometer can measure the orientation of the vehicle with respect to earth, while the gyroscope measures the rate of rotation around an axis. IMUs are commercially available in low-cost, low-power packages. For instance, an IMU 502 may take the form of or include a miniaturized MicroElectroMechanical System (MEMS) or a NanoElectroMechanical System (NEMS). Other types of IMUs may also be utilized. In a preferred embodiment, the IMU 502 is located in the drone 100 only.

An IMU 502 may include other sensors, in addition to accelerometers and gyroscopes, which may help to better determine position and/or help to increase autonomy of the drone 100 and/or the facility agent 200. Two examples of such sensors are magnetometers and pressure sensors. Other examples are also possible. It is to be noted that the drone 100 and/or the facility agent 200 could also include such additional sensors as separate components from an IMU.

While an accelerometer and gyroscope may be effective at determining the orientation of the drone 100 and/or the facility agent 200, slight errors in measurement may compound over time and result in a more significant error. However, an example the drone 100 and/or the facility agent 200 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

The drone 100 may also include a pressure sensor or barometer, which can be used to determine the altitude of the drone 100. Alternatively, other sensors, such as sonic altimeters or radar altimeters, can be used to provide an indication of altitude, which may help to improve the accuracy of and/or prevent drift of an IMU. It is to be noted that the drone 100 may have some sensors that are similar to those possessed by the facility agent 200 and some that are different from the facility agent 200. For example, both the drone and the facility agent may have a pressure sensor. However, while the drone 100 may contain the inertial measurement unit (which senses its orientation), there may not be a need for the facility agent 200 to have one.

In a further aspect, the drone 100 may include one or more sensors that allow the drone to sense objects in the environment. For instance, in the illustrated embodiment, the drone includes ultrasonic sensor(s) 504. Ultrasonic sensor(s) 504 can determine the distance to an object by generating sound waves and determining the time interval between the transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities. The facility agent 200 may also be provided with ultrasonic sensors.

Both the drone 100 and the facility agent 200 also include a GPS receiver 506. The GPS receiver 506 may be configured to provide data that is typical of well-known GPS systems, such as the GPS coordinates of the drone 100. Such GPS data may be utilized by the drone for various functions. For example, when a recipient uses a mobile device to request a package from the drone, the drone 100 may provide its GPS coordinates. As such, the drone may use its GPS receiver 506 to help navigate to the recipient location, as indicated, at least in part, by the GPS coordinates provided by their mobile device. Other examples are also possible.

The facility agent 200 may use the GPS receiver 506 in conjunction with the processor 510 to specify coordinates for drone 100 to proceed along as it travels to the facility, once it has entered the facility or after it has delivered its payload and is desirous of exiting the facility.

Both the drone 100 and the facility agent 200 may contain one or more imaging system(s) 508. For example, one or more still and/or video cameras may be utilized by the drone to capture image data from the drone's environment. As a specific example, charge-coupled device (CCD) cameras or complementary metal-oxide-semiconductor (CMOS) cameras can be used with unmanned vehicles. Such imaging sensor(s) 508 have numerous possible applications, such as obstacle avoidance, localization techniques, ground tracking for more accurate navigation (e.g., by applying optical flow techniques to images), video feedback, and/or image recognition and processing, among other possibilities.

In a further aspect, the drone 100 may use its one or more imaging system 508 to help in determining location. For example, the drone 100 may capture imagery of its environment and compare it to what it expects to see in its environment given current estimated position (e.g., its current GPS coordinates), and refine its estimate of its position based on this comparison. In a further aspect, the drone 100 may include one or more microphones. Such microphones may be configured to capture sound from the drone's environment.

The navigation module 515 may provide functionality that allows the drone to, e.g., move about in its environment and reach a desired location. To do so, the navigation module 515 may control the altitude and/or direction of flight by controlling the mechanical features of the drone 100 that affect flight (e.g., rotors of the drone).

In order to navigate the drone 100 to a target location, a navigation module 515 may implement various navigation techniques, such as map-based navigation and localization-based navigation, for instance. With map-based navigation, the drone 100 may be provided with a map of its environment, which may then be used to navigate to a particular location on the map. With localization-based navigation, the drone 100 may be capable of navigating in an unknown environment using localization. Localization-based navigation may involve a drone having a recipient facility map of its environment and calculating its position within the map and/or the position of objects in the environment. For example, as a drone 100 moves throughout its environment, the drone may continuously use localization to update its map of the environment. This continuous mapping process may be referred to as simultaneous localization and mapping (SLAM). Other navigation techniques may also be utilized.

In some embodiments, the navigation module 515 may navigate using a technique that relies on waypoints. In particular, waypoints are sets of coordinates that identify points in physical space. For instance, an air-navigation waypoint may be defined by a certain latitude, longitude, and altitude. Accordingly, navigation module 515 may cause the drone 100 to move from waypoint to waypoint, in order to ultimately travel to a final destination (e.g., a final waypoint in a sequence of waypoints).

In a further aspect, navigation module 515 and/or other components and systems of drone 100 and/or the facility agent 200 may be configured for "localization" to more precisely navigate to the facility. More specifically, it may be desirable in certain situations for the drone to be close to the facility where its payload has to be delivered. To this end, the drone 100 may use a two-tiered approach in which it uses a more-general location-determination technique to navigate to the facility that is associated with the recipient, and then use a more-refined location-determination technique to identify and/or navigate to the target location within the facility area.

For example, the drone 100 may navigate to the general area (i.e., an approximate target location) of the recipient using waypoints that are pre-determined based on GPS coordinates provided by a remote device at the facility. The drone 100 may then switch to mode in which it utilizes a localization process to locate and travel to a specific location within the facility.

Communication between the drone 100 and the facility agent 200 can occur via a communication system (520). The communication system 520 may include one or more wireless interfaces and/or one or more wireline interfaces, which allow the drone to communicate via one or more networks with the facility agent. The communication system may be provided by the facility, or by the drone, or by both the facility and the drone. In an embodiment, the communication system is provided by the facility.

Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an exemplary embodiment, the drone 100 and the facility agent 200 may include communication systems 520 that allow for both short-range communication and long-range communication. For example, the drone 100 may be configured for short-range communications using Bluetooth and for long-range communications under a CDMA protocol. In such an embodiment, the drone 100 may be configured to function as a "hot spot;" or in other words, as a gateway or proxy between a remote support device and one or more data networks, such as cellular network and/or the Internet. Configured as such, the drone 100 may facilitate data communications that the facility might otherwise be unable to perform by itself.

For example, the drone 100 may provide a WiFi connection to the facility, and serve as a proxy or gateway to a cellular service provider's data network, which the drone might connect to under an LTE or a 3G protocol, for instance. The drone 100 may also serve as a proxy or gateway to a high-altitude balloon network, a satellite network, or a combination of these networks, among others, which a remote device might not be able to otherwise access. Alternatively, as stated above, these communication systems may be provided by the facility instead of the drone 100 or by both the drone 100 and the facility.

In summary, the system encompasses a computer program product comprising a non-transitory storage medium readable by a processing circuit and storing instructions for execution by the processing circuit for performing a method comprising autonomously initiating communication between a drone and a facility agent located at a facility where the drone will deliver a payload to; offering the drone a set of delivery strategies in accordance with a constraint or a goal; and reaching an agreement between the drone and the facility agent on one delivery strategy for the payload.

The system detailed herein is advantageous in that it allows autonomous communication between the drone and the facility agent without any human intervention. It is therefore an inexpensive system to operate and does not suffer from the usual drawbacks associated with human endeavor such as fatigue, human error and the like. The system is therefore better secured and protects against privacy violations. The use of optimized goal setting between the drone and the facility agent also permits an efficient operation of the system.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for coordinating the delivery of a payload by a drone to a recipient, the system comprising:
    a drone; where the drone is an autonomous vehicle that is operative to perform one or more functions without human intervention; and
    a facility agent acting on behalf of an external facility in which the recipient is located; where the facility agent is autonomous and is operative to act on behalf of either the recipient or the external facility in which the recipient is located; and where the facility agent comprises:
        an access option enumerator for computing a set of delivery strategies in accordance with a constraint or a goal; and
        an access negotiator for reaching an agreement between the drone and the facility agent on a delivery strategy for the payload.

2. The system of claim 1, where the facility agent further comprises an authorization unit that is operative to receive and verify authentication information from the drone.

3. The system of claim 1, where the facility agent further comprises a drone operations monitor that is operative to monitor operation of the drone once the drone is permitted to enter the external facility.

4. The system of claim 1, where the facility agent further comprises a drone controller that is operative to control the drone once the drone is permitted to enter the external facility.

5. The system of claim 3, where the drone operations monitor is in two-way communication with a database that is operative to store facility sensor data and drone sensor data.

6. The system of claim 1, where the access option enumerator is in two way communication with a database that contains facility map data, facility sensor data and contextual data.

7. The system of claim 1, where the drone comprises an authentication unit that is operative to identify the drone to an authorization unit contained in the facility agent.

8. The system of claim 1, where the drone comprises a self-description unit that is operative to detail the payload as well as characteristics of the drone to the facility agent.

9. The system of claim 1, where the drone comprises an access-option evaluator that evaluates the set of delivery strategies and selects a strategy and where the access-option evaluator communicates with the access negotiator.

10. The system of claim 1, where the set of delivery strategies are selected to maximize a goal; where the goal comprises promoting safety, improving an efficiency of delivery, energy conservation, noise reduction, pollution reduction, maintaining privacy, reduction of visible disturbances, or a weighted combination thereof.

11. The system of claim 1, where the drone comprises a configuration manager and a motion controller that are operative to control configuration of the drone and its travel respectively.

12. The system of claim 4, where the drone controller assumes control of the drone from a motion controller located in the drone.

13. A method comprising:
    autonomously initiating communication between a drone and a facility agent located at an external facility where the drone will deliver a payload to;
    offering the drone a set of delivery strategies in accordance with a constraint or a goal; and
    reaching an agreement between the drone and the facility agent on one delivery strategy for the payload.

14. The method of claim 13, where the communication is initiated by the drone arriving at a location that is proximate to the facility but remote from the external facility and where the offering the drone a set of delivery strategies is initiated by the facility agent.

15. The method of claim 13, where the drone comprises an access-option evaluator that evaluates the set of delivery strategies.

16. The method of claim 13, where the set of delivery strategies are selected to maximize a goal.

17. The method of claim 16, where the goal comprises promoting safety, improving an efficiency of delivery, energy conservation, noise reduction, pollution reduction, maintaining privacy, reduction of visible disturbances, or a weighted combination thereof.

18. A computer program product comprising:
    a non-transitory storage medium readable by a processing circuit and storing instructions for execution by the processing circuit for performing a method comprising:

autonomously initiating communication between a drone and a facility agent located at an external facility where the drone will deliver a payload to;
offering the drone a set of delivery strategies in accordance with a constraint or a goal; and
reaching an agreement between the drone and the facility agent on one delivery strategy for the payload.

* * * * *